UNITED STATES PATENT OFFICE 2,673,882

MIXED HIGHER POLYOXYALKYLENE ETHERS OF HEXITOLS

William C. Griffin, West Chester, Pa., assignor to Atlas Powder Company, Wilmington, Del., a corporation of Delaware No Drawing. Application March 6, 1951, Serial No. 214,229

12 Claims. (Cl. 260—615)

The present invention relates to a composition of matter. More specifically it relates to high molecular weight mixed polyoxyalkylene ethers of hexitols.

An object of the present invention is to provide new and useful high molecular weight mixed polyoxyalkylene ethers of hexitols.

Another object is to provide a method of preparing new and useful high molecular weight mixed polyoxyalkylene ethers of hexitols.

These and other objects will become apparent in the course of the following description.

The mixed polyoxyalkylene ethers of hexitols of the class to be defined hereinafter have been found of value as intermediates in the preparation of organic compounds and are particularly valuable in the preparation of compounds for use in the field of oil-water emulsion stratification. They are also valuable as moisture conditioning and thickening agents.

The novel mixed polyoxyalkylene ethers of hexitols of the present invention may be represented by the following formula:

$$R([O(CH_2)_x]_m[O(CH_2)_y]_nOH)_6$$

wherein:

R is the residue of a hexitol; $x$ and $y$ represent 2 or 3 and are of different values; $m$ and $n$ each represents an integer above 6 and preferably below about 35 and the ratio of $m$:$n$ lies within the limits of from 3:1 to 1:3.

These compounds are prepared by separate and subsequent etherification of a hexitol with the desired proportions of each of ethylene and 1,2 propylene oxides. The reaction between the hexane polyol and alkylene oxide will proceed at atmospheric pressure or even subatmospheric pressure, without any additive assistants simply by addition of the alkylene oxide to the polyol at a temperature in excess of about 150° C. However, it has been found advisable to operate under a superatmospheric pressure and in the presence of an alkaline catalyst such as caustic soda, soda ash, salts of strong alkalies and weak bases such as sodium acetate and the like, which permits etherification at a lower temperature. The reaction is safely and conveniently performed employing a temperature of from 115° to 150° C., under a pressure of from 30 to 50 p. s. i., in the presence of from 0.05 to 0.5% catalyst based on total charge. Prior to the reaction the atmosphere within the reactor is flushed with alkylene oxide or an inert gas. Thorough agitation is constantly provided during the course of the reaction. It is immaterial which of the alkylene oxides is introduced first.

The following examples are cited to illustrate the invention. They are not intended to limit it in any way.

Example I 182 grams of dry crystalline sorbitol is charged into an autoclave. The temperature is raised to 140° C., and the air above the molten sorbitol is flushed with ethylene oxide. Agitation is begun and 2.64 grams of sodium methylate catalyst is added. The pressure of the system is increased to 40 p. s. i. by pumping in ethylene oxide. The pressure is maintained by the ethylene oxide source until 2200 grams have been reacted. The gas feed is then changed to propylene oxide and the pressure maintained until 2900 grams have been reacted. The resulting product represents *50-polyoxypropylene, 50-polyoxyethylene sorbitol.

Example II 100-polyoxypropylene, 100-polyoxyethylene sorbitol is prepared following the procedure of Example I employing 91 grams of sorbitol, 2.59 grams of sodium oleate as catalyst, 2200 grams of ethylene oxide and 2900 grams of propylene oxide.

Example III 200-polyoxypropylene, 200-polyoxyethylene sorbitol is prepared following the procedure of Example I employing 91 grams of sorbitol, 5.14 grams of sodium ethoxide as catalyst, 4400 grams of ethylene oxide and 5800 grams of propylene oxide.

The etherification may also be performed using an aqueous solution of the polyol. In this event, a portion of the added alkylene oxide is consumed in the production of polyglycols. To attain the necessary oxyalkylene chain length under such conditions this factor must be considered and appropriate compensation made. For use in emulsion breaking, separation from the polyglycols has not been found necessary. Derivatives formed from polyols containing as much as 15% water have been found satisfactory.

Example IV 182 grams of dry crystalline sorbitol is charged into an autoclave. The temperature is raised to 140° C., and the air above the molten sorbitol is flushed with ethylene oxide. Agitation is begun and 5.54 grams of sodium methylate catalyst is

---

\* Figure indicates average number of polyoxyalkylene groups per mol of hexitol.

added. The pressure is increased to 40 p. s. i. by pumping in ethylene oxide. The pressure is maintained over the range of 30–40 p. s. i. until 2200 grams of ethylene oxide have reacted. The gas feed is then changed to 1,2 propylene oxide and the pressure maintained within the range until 8700 grams have reacted. The product is 150-polyoxypropylene, 50-polyoxyethylene sorbitol.

The following example illustrates the production of a mixed polyoxyalkylene hexitol by etherification in the presence of 12% water.

*Example V*

A 22 gram sample of sorbitol containing 12% water is reacted in accordance with the procedure of Example I with 733 grams of ethylene oxide and 966 grams of propylene oxide using 1.72 grams of sodium methylate as catalyst. The product is a polyglycol solution of 100-polyoxypropylene, 100-polyoxyethylene sorbitol.

Other modifications of this class of mixed polyoxyethylene ethers of hexane polyols are prepared as follows:

2. The compound of claim 1 wherein $A_1$ is the alkylene radical of ethylene oxide.
3. The compound of claim 1 wherein $A_1$ is the alkylene radical of 1,2-propylene oxide.
4. The compound of claim 2 wherein the products $6m$ and $6n$ are each 50.
5. The compound of claim 2 wherein the products $6m$ and $6n$ are each 100.
6. The compound of claim 2 wherein the products $6m$ and $6n$ are each 200.
7. The compound of claim 2 wherein the product $6m$ is 50 and the product $6n$ is 100.
8. The compound of claim 2 wherein R is the mannitol residue.
9. The compound of claim 3 wherein the product $6m$ and the product $6n$ are each 100.
10. The compound of claim 4 wherein R is the sorbitol residue.
11. The compound of claim 5 wherein R is the sorbitol residue.
12. The compound of claim 6 wherein R is the sorbitol residue.

WILLIAM C. GRIFFIN.

| Example | Hexane Polyol | Alkylene Oxides | Catalyst | Product |
|---|---|---|---|---|
| VI | 91 grams of mannitol. | 5,800 gr. PrO*; 2,200 gr. EtO**. | 5.2 grams of caustic soda. | 100-polyoxyethylene; 200-polyoxypropylene mannitol. |
| VII | 36.4 gr. dulcitol. | 812 gr. PrO*; 1,760 gr. EtO**. | 2.6 grams of soda ash. | 200-polyoxyethylene; 70-polyoxypropylene ducitol. |
| VIII | 91 grams of sorbitol. | 2,900 gr. PrO*; 2,200 gr. EtO**. | 5.2 grams of sodium methylate. | 100-polyoxyethylene; 100-polyoxypropylene sorbitol. |

* Indicates 1,2 propylene oxide.
** Indicates ethylene oxide.

It will be apparent to those skilled in the art that many variations of the above disclosures are possible without departing from the scope of the invention.

What is claimed is:
1. A compound of the formula:

$$R([OA_1]_m[OA_2]_nOH)_6$$

wherein R is the residue of a hexitol, $A_1$ and $A_2$ represent, respectively, alkylene radicals of different 1,2-alkylene oxides containing no more than 3 carbon atoms, $m$ and $n$ each represent a number above 6, and the ratio of $m:n$ lies within the limits 1:3 to 3:1.

References Cited in the file of this patent

UNITED STATES PATENTS

| Number | Name | Date |
|---|---|---|
| 1,922,459 | Schmidt et al. | Aug. 15, 1933 |
| 2,481,278 | Ballard et al. | Sept. 6, 1949 |
| 2,549,435 | De Groote et al. | Apr. 17, 1951 |
| 2,552,528 | De Groote | May 15, 1951 |
| 2,552,529 | De Groote | May 15, 1951 |

FOREIGN PATENTS

| Number | Country | Date |
|---|---|---|
| 616,256 | Great Britain | Jan. 19, 1949 |